United States Patent
Duffy

(10) Patent No.: US 9,394,976 B2
(45) Date of Patent: Jul. 19, 2016

(54) HYDRAULICALLY RATCHETED CHAIN TENSIONER

(71) Applicant: Schaeffler Technologies GmbH & Co. KG, Herzogenaurach (DE)

(72) Inventor: Ryan Duffy, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 258 days.

(21) Appl. No.: 14/278,641

(22) Filed: May 15, 2014

(65) Prior Publication Data

US 2014/0364257 A1    Dec. 11, 2014

Related U.S. Application Data

(60) Provisional application No. 61/832,325, filed on Jun. 7, 2013.

(51) Int. Cl.
*F16H 7/08* (2006.01)

(52) U.S. Cl.
CPC ...... *F16H 7/0848* (2013.01); *F16H 2007/0806* (2013.01); *F16H 2007/0812* (2013.01); *F16H 2007/0853* (2013.01); *F16H 2007/0859* (2013.01)

(58) Field of Classification Search
CPC . F16H 7/08; F16H 7/0848; F16H 2007/0806; F16H 2007/0812; F16H 2007/0853; F16H 2007/0859

USPC ................... 474/109, 110, 111, 140
See application file for complete search history.

(56) References Cited

U.S. PATENT DOCUMENTS 5,366,415 A * 11/1994 Church ............... F16H 7/0848
                                                      474/110
6,244,981 B1 * 6/2001 Simpson ............. F16H 7/0848
                                                      474/110

(Continued)

FOREIGN PATENT DOCUMENTS

EP    1715217 A2    10/2006
EP    1760364 A2    3/2007

*Primary Examiner* — William E Dondero
*Assistant Examiner* — Robert T Reese
(74) *Attorney, Agent, or Firm* — Volpe and Koenig, P.C.

(57) ABSTRACT

A hydraulically ratcheted tensioner is provided. The tensioner includes a tensioner housing and a plunger including a groove is located partially in a piston chamber in the tensioner housing. The plunger is pressurizable by hydraulic fluid. A ratchet device includes a ratchet housing and a piston having an angled end. A spring biases the piston such that the angled end is forced against a ratchet pin that extends radially through a hole in the ratchet housing and the tensioner housing. The ratchet pin is biased against the piston by a ratchet spring. In a first, non-pressurized state, the ratchet pin engages the groove. In a second, pressurized state, the pressurized hydraulic fluid forces the piston against the spring such that the angled end disengages the ratchet pin and the ratchet spring moves the ratchet pin to a position disengaged from the groove, and the hydraulic fluid pressurizes the plunger.

8 Claims, 5 Drawing Sheets

(56) References Cited

U.S. PATENT DOCUMENTS

| | | | | |
|---|---|---|---|---|
| 6,547,684 B2* | 4/2003 | Kurohata | F16H 7/0836 474/109 |
| 6,612,951 B2* | 9/2003 | Kurohata | F16H 7/0848 474/109 |
| 7,513,843 B2* | 4/2009 | Markley | F16H 7/0848 474/111 |
| 2003/0125143 A1* | 7/2003 | Seungpyo | F16H 7/0848 474/110 |
| 2004/0029664 A1* | 2/2004 | Yoshida | F16H 7/0848 474/109 |
| 2004/0092350 A1* | 5/2004 | Hashimoto | F16H 7/0848 474/110 |
| 2004/0127316 A1* | 7/2004 | Hashimoto | F16H 7/0848 474/109 |
| 2007/0054767 A1* | 3/2007 | Yamada | F16H 7/0848 474/109 |
| 2010/0173735 A1* | 7/2010 | Suchecki | F02B 67/06 474/110 |
| 2010/0298077 A1* | 11/2010 | Hirayama | F01L 1/02 474/110 |
| 2010/0298078 A1* | 11/2010 | Hirayama | F01L 1/02 474/110 |

* cited by examiner

HYDRAULICALLY RATCHETED CHAIN TENSIONER

INCORPORATION BY REFERENCE

The following documents are incorporated herein by reference as if fully set forth: U.S. Provisional Application No.: 61/832,325, filed Jun. 7, 2013.

FIELD OF INVENTION

This application is generally related to a tensioner and more particularly related to a ratcheting device for a tensioner.

BACKGROUND

Tensioners are widely used in mechanical applications for controlling load fluctuations in a chain or belt. Known ratcheted tensioners are disclosed in EP 1760364 and EP 1715217. Ratcheted tensioners typically include ratchet devices with mechanical type locking components. For example, EP 1760364 discloses a register ring that slides between a flanged body and a plunger to lock the plunger in place. These types of ratcheted tensioners exhibit uneven locking and produce undesirable noise due to friction caused by movement of ratchet components.

SUMMARY

It would be desirable to provide a ratcheted tensioner that maintains at least some of the tension generated by engine oil pressure while an engine is off, and also provides unimpeded and quiet movement during engine operation.

A hydraulically ratcheted tensioner is provided. The hydraulically ratcheted tensioner includes a tensioner housing and a plunger located at least partially in a piston chamber in the tensioner housing. The plunger includes at least one groove that extends at least partially circumferentially and the plunger is biased against a chain or belt by a plunger spring mounted within the tensioner housing. For additional tensioning during engine operation, the plunger is pressurizable by hydraulic fluid. A ratchet device is arranged adjacent to the tensioner housing and includes a ratchet housing and a piston having an angled end. A spring biases the piston such that the angled end is forced against a ratchet pin that extends radially through a hole in the ratchet housing and the tensioner housing. The ratchet pin is biased against the angled end of the piston by a ratchet spring. In a first, non-pressurized state, the ratchet pin engages in the at least one groove. In a second, pressurized state, the pressurized hydraulic fluid forces the piston against the spring such that the angled end disengages from the ratchet pin and the ratchet spring moves the ratchet pin to a position disengaged from the at least one groove in the plunger, and the hydraulic fluid pressurizes the plunger.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
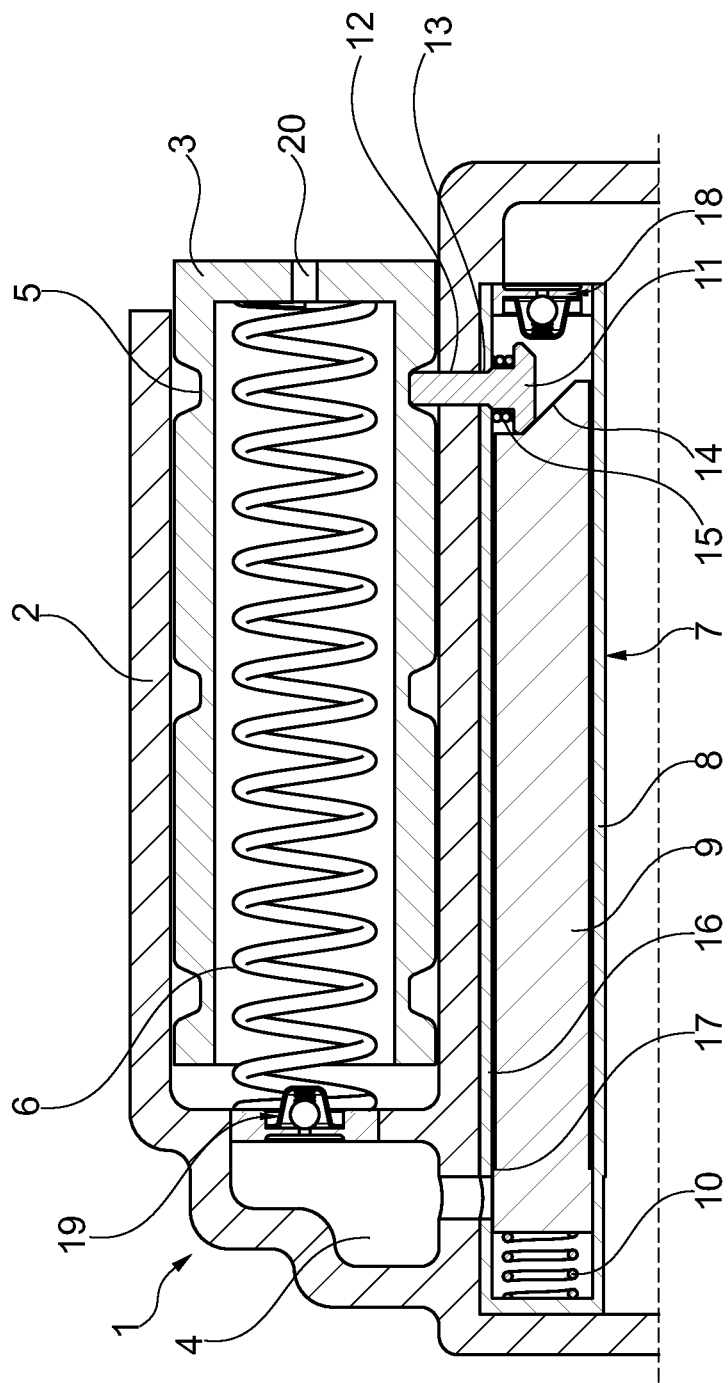
FIG. 1 is a cross sectional view of a preferred embodiment of a hydraulically ratcheted tensioner according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivates thereof, and words of similar import.

FIG. 1 shows a preferred embodiment of a hydraulically ratcheted tensioner 1 according to the present invention. The hydraulically ratcheted tensioner 1 includes a tensioner housing 2 and a plunger 3 located at least partially in a piston chamber 4 in the tensioner housing 2. The plunger 3 includes at least one groove 5 that extends at least partially circumferentially. The plunger 3 preferably includes a plurality of the grooves 5 that are spaced axially apart from each other. The plunger 3 is biased against a chain or belt by a plunger spring 6 mounted within the tensioner housing 2. The plunger 3 is pressurizable by hydraulic fluid, typically when the engine is running. The hydraulic fluid can discharge from the plunger 3 via a leakage hole 20.

Figure 2A:
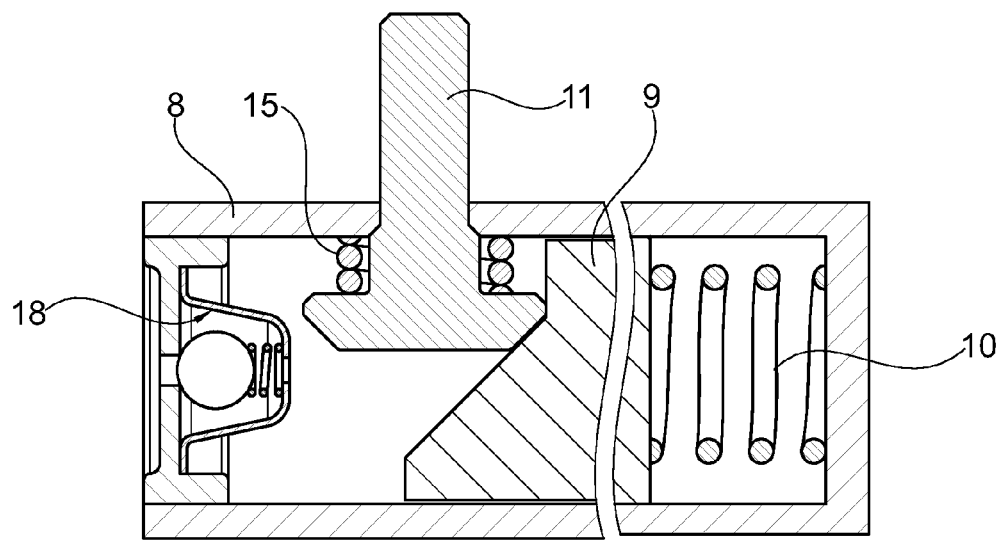
FIGS. 2A and 2B are cross sectional views of a ratchet device of the hydraulically ratcheted tensioner in a first, non-pressurized state and a second, pressurized state, respectively.
Figure 2B:
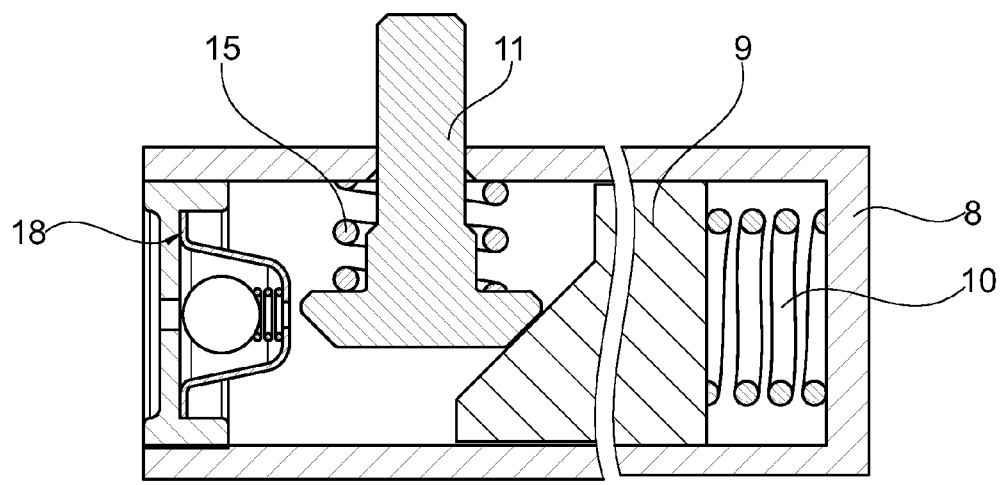
Figure 3A:
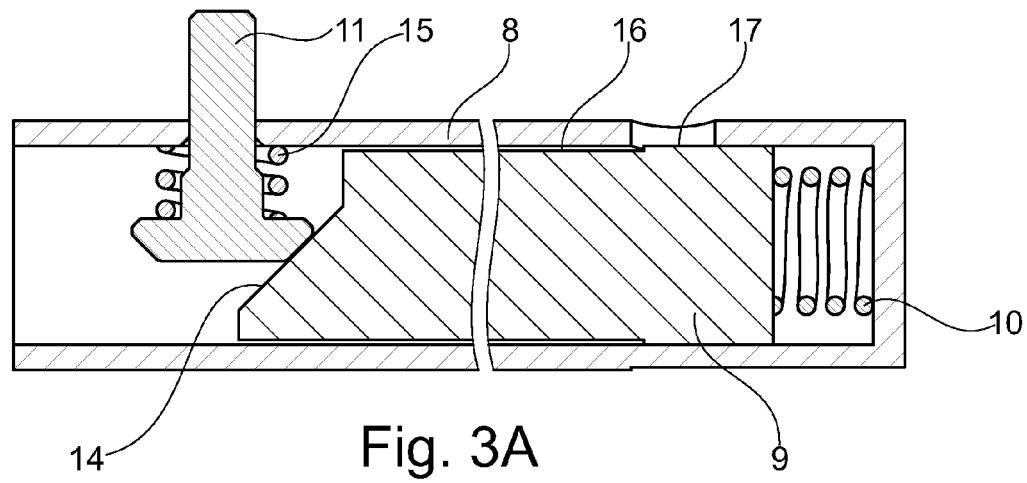
FIGS. 3A and 3B are cross sectional views of the ratchet device of the hydraulically ratcheted tensioner in a first, non-pressurized state and a second, pressurized state, respectively.
Figure 3B:
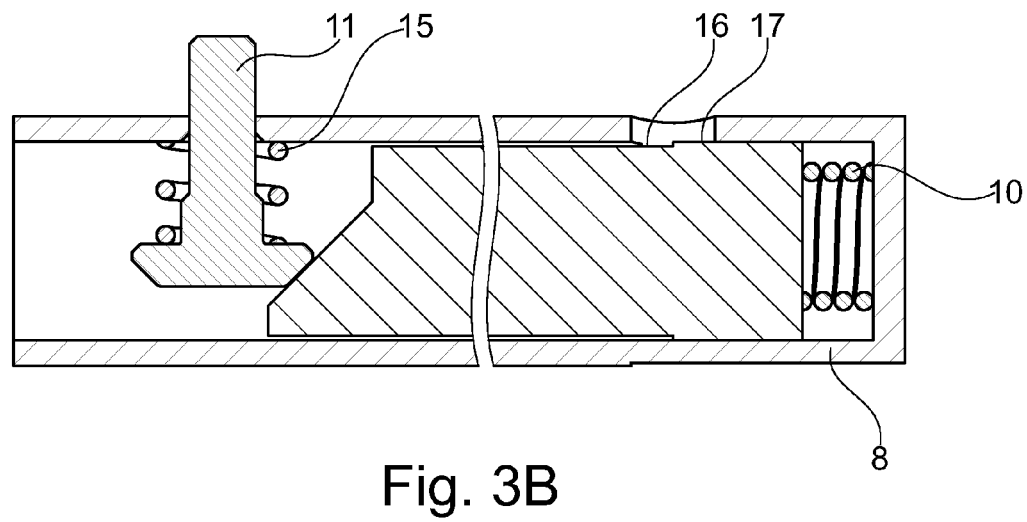
Figure 4:
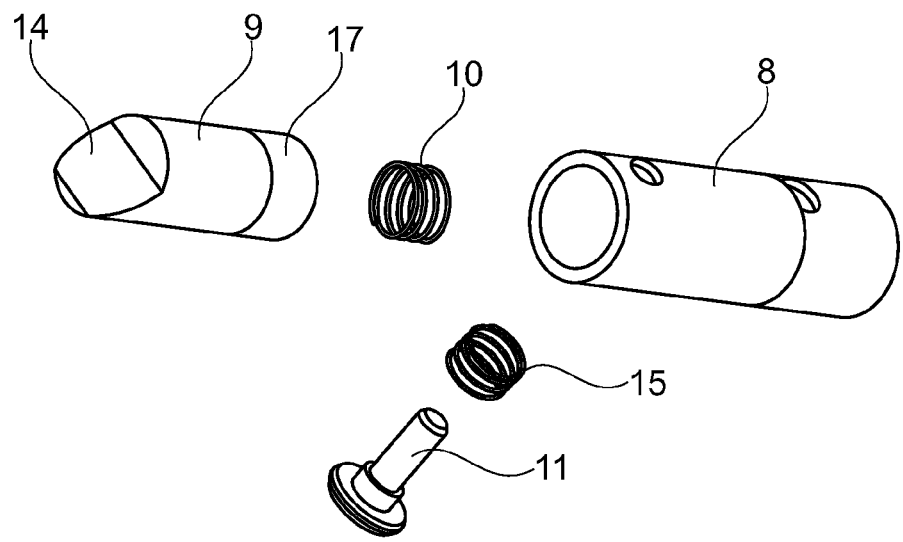
FIG. 4 is an exploded perspective view of the ratchet device.

The hydraulically ratcheted tensioner 1 includes a ratchet device 7, shown more clearly in FIGS. 2A, 2B, 3A, and 3B, which show two different states of operation, and FIG. 4, which shows the ratchet device 7 disassembled. The ratchet device 7 is arranged adjacent to the tensioner housing 2 and includes a ratchet housing 8 and a piston 9 having an angled end 14. The angled end 14 can be a ball, conical, wedge, or other suitable angled shape. The tensioner housing 2 and the ratchet housing 8 can be formed as a unitary part. Alternatively, they are separate parts that are connected together. A spring 10 biases the piston 9 such that the angled end 14 is forced against a ratchet pin 11 that extends radially through a hole in the tensioner housing 12 and a hole in the ratchet housing 13. The ratchet pin 11 is biased against the angled end 14 of the piston 9 by a ratchet spring 15. As more clearly shown in FIGS. 3A and 3B, an end of the ratchet pin 11 preferably has a head with an edge that is beveled at the same angle as the angled end 14 of the piston 9.

Figure 5:
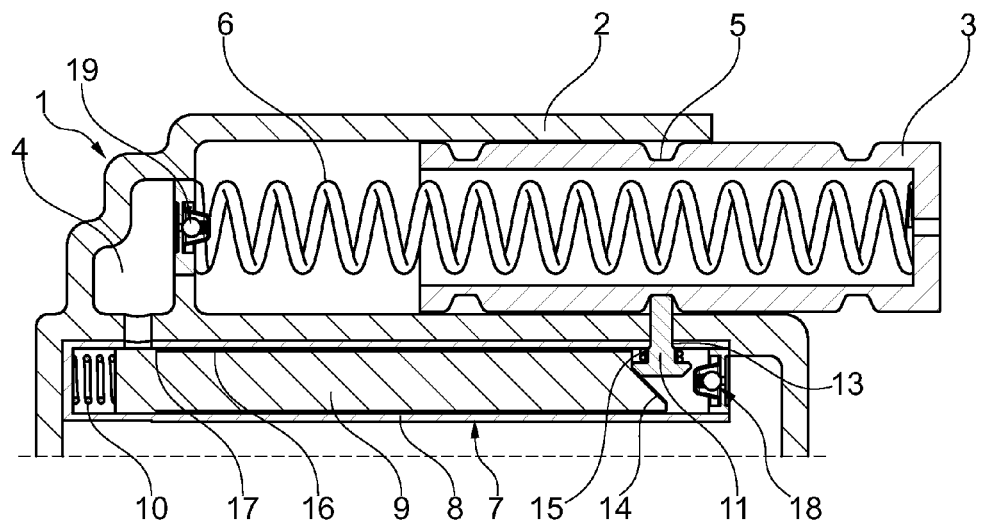
FIG. 5 is a cross sectional view of the hydraulically ratcheted tensioner with a ratchet pin engaged in a second groove.

When the engine is off, no hydraulic fluid flows through the hydraulically ratcheted tensioner 1. The hydraulically ratcheted tensioner 1 can maintain at least some of the tension generated by oil pressure when the engine is off via the ratchet pin 11, which can be fixed in position to engage the at least one groove 5 on the plunger 3. In a first, non-pressurized state, the ratchet pin 11 engages the at least one groove 5. FIG. 1 shows the ratchet pin 11 engaged with a first one of the at least one grooves 5. FIG. 5 shows the ratchet pin 11 engaged with a second one of the at least one grooves 5'. When the ratchet pin 11 is engaged with the second one of the at least one grooves 5', the initial tensioning force from the plunger 3 is greater than the initial tensioning force from the plunger 3 when the ratchet pin 11 is engaged with the first one of the at least one grooves 5. FIGS. 2A and 3A show the ratchet device 7 in the first, non-pressurized state. In a second, pressurized state, the pressurized hydraulic fluid forces the piston 9 against the spring 10 such that the angled end 14 disengages from the ratchet pin 11 and the ratchet spring 15 moves the ratchet pin 11 to a position disengaged from the at least one plunger groove 5, and the hydraulic fluid pressurizes the plunger 3. FIGS. 2B and 3B show the ratchet device 7 in the second, pressurized state.

Figure 6:
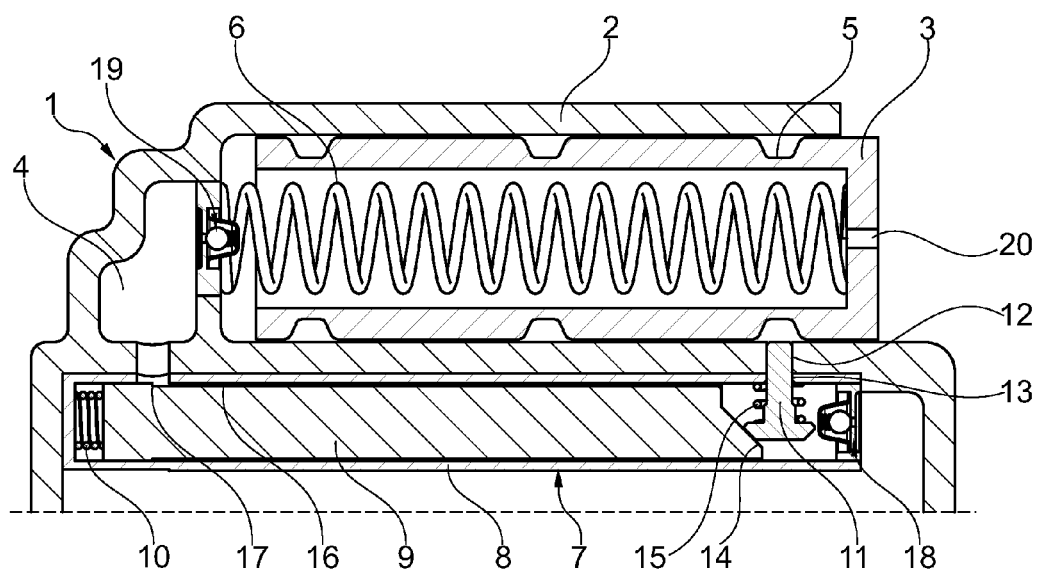
FIG. 6 is a cross sectional view of the hydraulically ratcheted tensioner in a second, pressurized state.

A leakage gap 16 for the hydraulic fluid is defined along an outer surface of the piston 9, and a step 17 on the outer surface of the piston 9 blocks the hydraulic fluid from entering the piston chamber 4 in the first state. The piston 9 is axially displaced in the ratchet housing 8 by the hydraulic fluid to allow the hydraulic fluid to flow in the leakage gap 16 from the ratchet housing 8 to the piston chamber 4 in the second state. As shown in FIG. 6, the hydraulic fluid forces the piston 9 axially against the spring 10 and the ratchet pin 11 disengages from the at least one groove 5 in the plunger 3. The ratchet spring 15 presses the ratchet pin 11 out of engagement with the at least one groove 5. As shown by comparing FIGS. 1 and 6, the ratchet pin 11 engages the angled end 14 of the piston 9 at different points depending on the hydraulic fluid pressure. In the second state, the plunger 3 is forced by the hydraulic fluid in the axial direction to apply additional tensioning force to the belt or chain.

A first check valve 18 is arranged at an axial end of the ratchet housing 8, and prevents egress of the hydraulic fluid from the ratchet housing 8 in the first state. The first check valve 18 can include a housing, a ball, and a spring. A second check valve 19, which is preferably similar in construction to the first check valve 18, is arranged in the tensioner housing 2, and blocks egress of the hydraulic fluid from a first end of the piston chamber 4 in the first state.

Having thus described various embodiments of the present hydraulically ratcheted tensioner in detail, it will be appreciated and apparent to those skilled in the art that many changes, only a few of which are exemplified in the detailed description above, could be made in the hydraulically ratcheted tensioner according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

REFERENCE NUMBERS

1 Hydraulically Ratcheted Tensioner
2 Tensioner Housing
3 Plunger
4 Piston Chamber
5 Groove
6 Plunger Spring
7 Ratchet Device
8 Ratchet Housing
9 Piston
10 Spring
11 Ratchet Pin
12 Hole in Tensioner Housing
13 Hole in Ratchet Housing
14 Angled End
15 Ratchet Spring
16 Leakage Gap
17 Step
18 First Check Valve
19 Second Check Valve
20 Leakage Hole

What is claimed is:

1. A hydraulically ratcheted tensioner, comprising:
   a tensioner housing and a plunger located at least partially in a piston chamber in the tensioner housing, the plunger includes at least one groove that extends at least partially circumferentially and the plunger is biased against a chain or belt by a plunger spring mounted within the tensioner housing, the plunger is pressurizable by hydraulic fluid,
   a ratchet device arranged adjacent to the tensioner housing includes a ratchet housing and a piston having an angled end, a spring biases the piston such that the angled end is forced against a ratchet pin that extends radially through a hole in the ratchet housing and the tensioner housing, the ratchet pin is biased against the angled end of the piston by a ratchet spring, and
   in a first, non-pressurized state, the ratchet pin engages the at least one groove, and in a second, pressurized state, the pressurized hydraulic fluid forces the piston against the spring such that the angled end disengages from the ratchet pin and the ratchet spring moves the ratchet pin to a position disengaged from the at least one groove, and the hydraulic fluid pressurizes the plunger.

2. The hydraulically ratcheted tensioner of claim 1, wherein the tensioner housing and the ratchet housing are formed as a unitary part.

3. The hydraulically ratcheted tensioner of claim 1, wherein a leakage gap for the hydraulic fluid is defined along an outer surface of the piston, and a step on the outer surface of the piston blocks the hydraulic fluid from entering the piston chamber in the first state.

4. The hydraulically ratcheted tensioner of claim 3, wherein the piston is axially displaced in the ratchet housing by the hydraulic fluid to allow the hydraulic fluid to flow in the leakage gap from the ratchet housing to the piston chamber in the second state.

5. The hydraulically ratcheted tensioner of claim 1, wherein the plunger includes a plurality of the grooves that are spaced axially apart from each other.

6. The hydraulically ratcheted tensioner of claim 1, wherein a first check valve is arranged at an axial end of the ratchet housing, and prevents egress of the hydraulic fluid from the ratchet housing in the first state.

7. The hydraulically ratcheted tensioner of claim 1, wherein a second check valve is arranged in the tensioner housing, and blocks egress of the hydraulic fluid from a first end of the piston chamber in the first state.

8. The hydraulically ratcheted tensioner of claim 1, wherein the hydraulic fluid is discharged from the plunger via a leakage hole.

* * * * *